March 6, 1934.  R. A. COSH  1,949,901
APPARATUS FOR FIRE FINISHING GLASS ARTICLES
Filed June 29, 1932  5 Sheets-Sheet 2
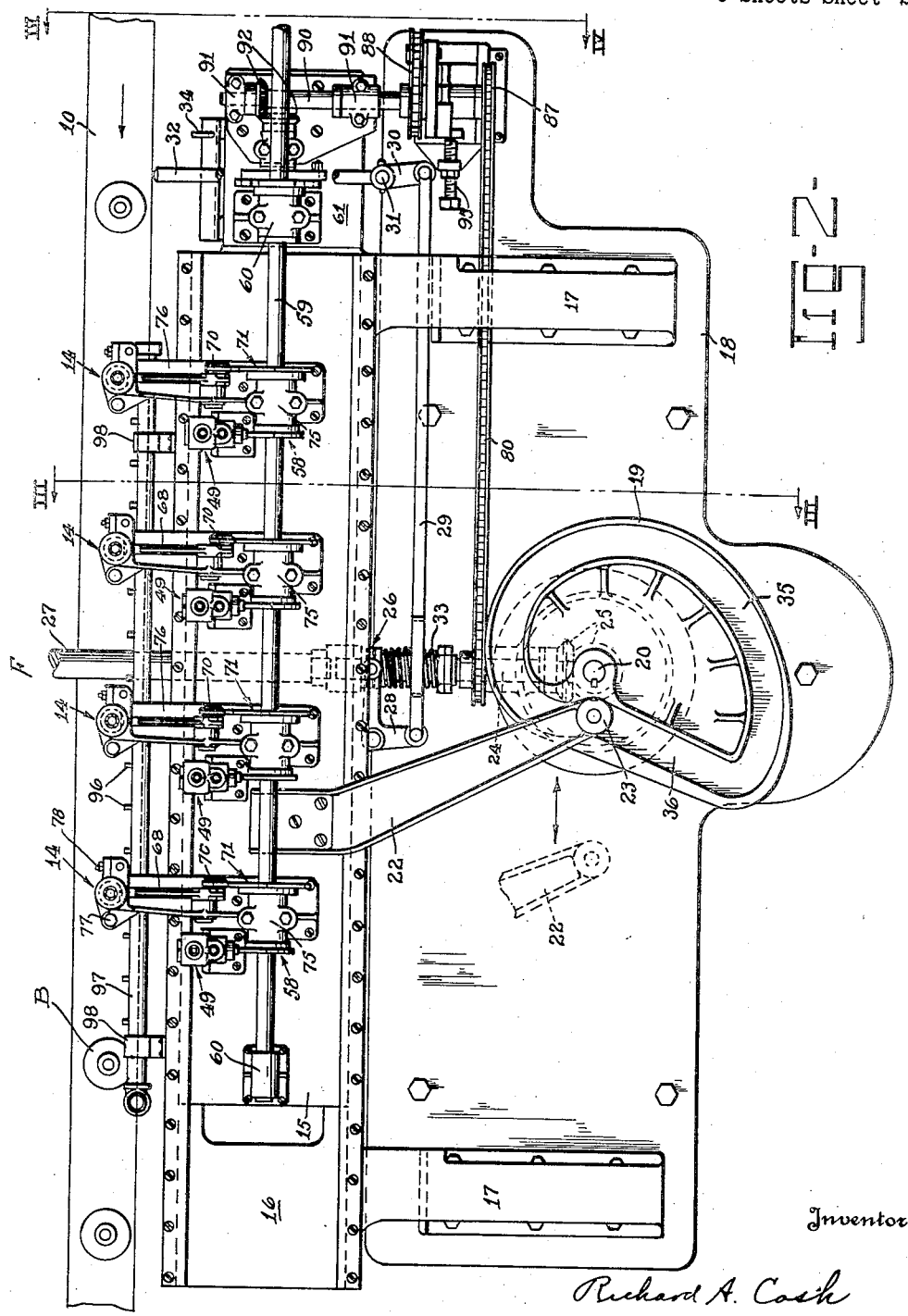
Inventor
Richard A. Cosh
By J. F. Rule
Attorney March 6, 1934.　　　　R. A. COSH　　　　1,949,901
APPARATUS FOR FIRE FINISHING GLASS ARTICLES
Filed June 29, 1932　　　5 Sheets-Sheet 3
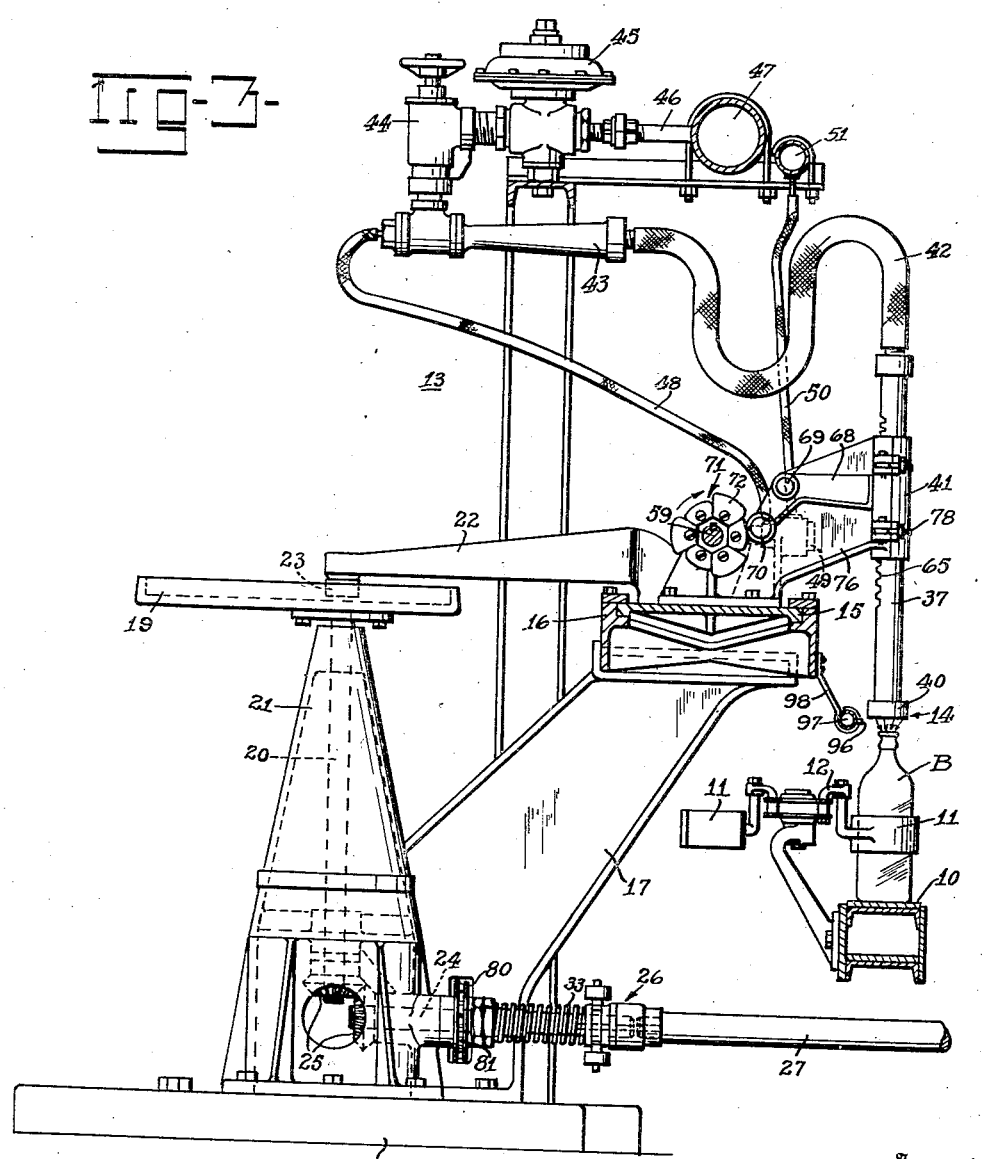

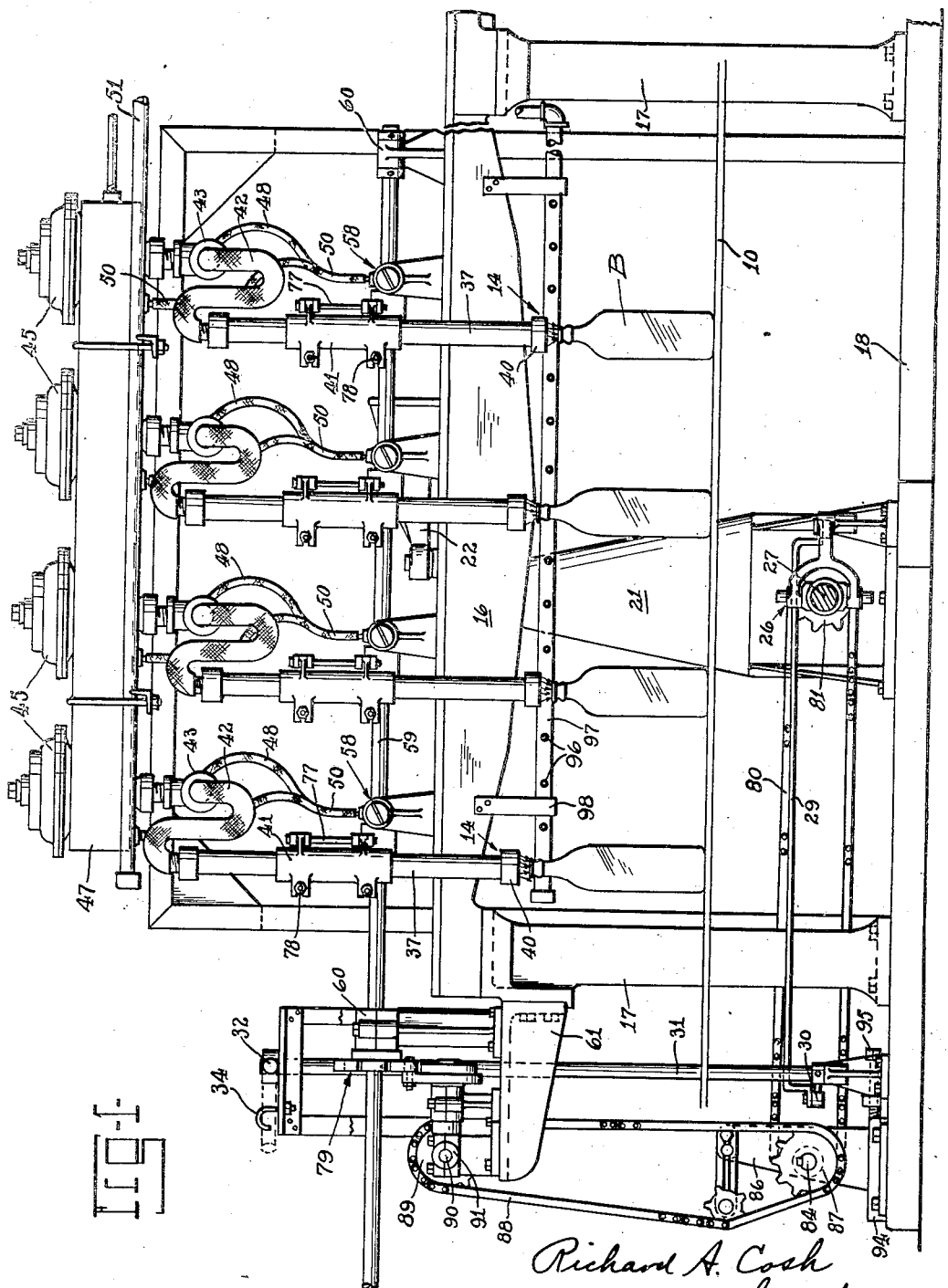

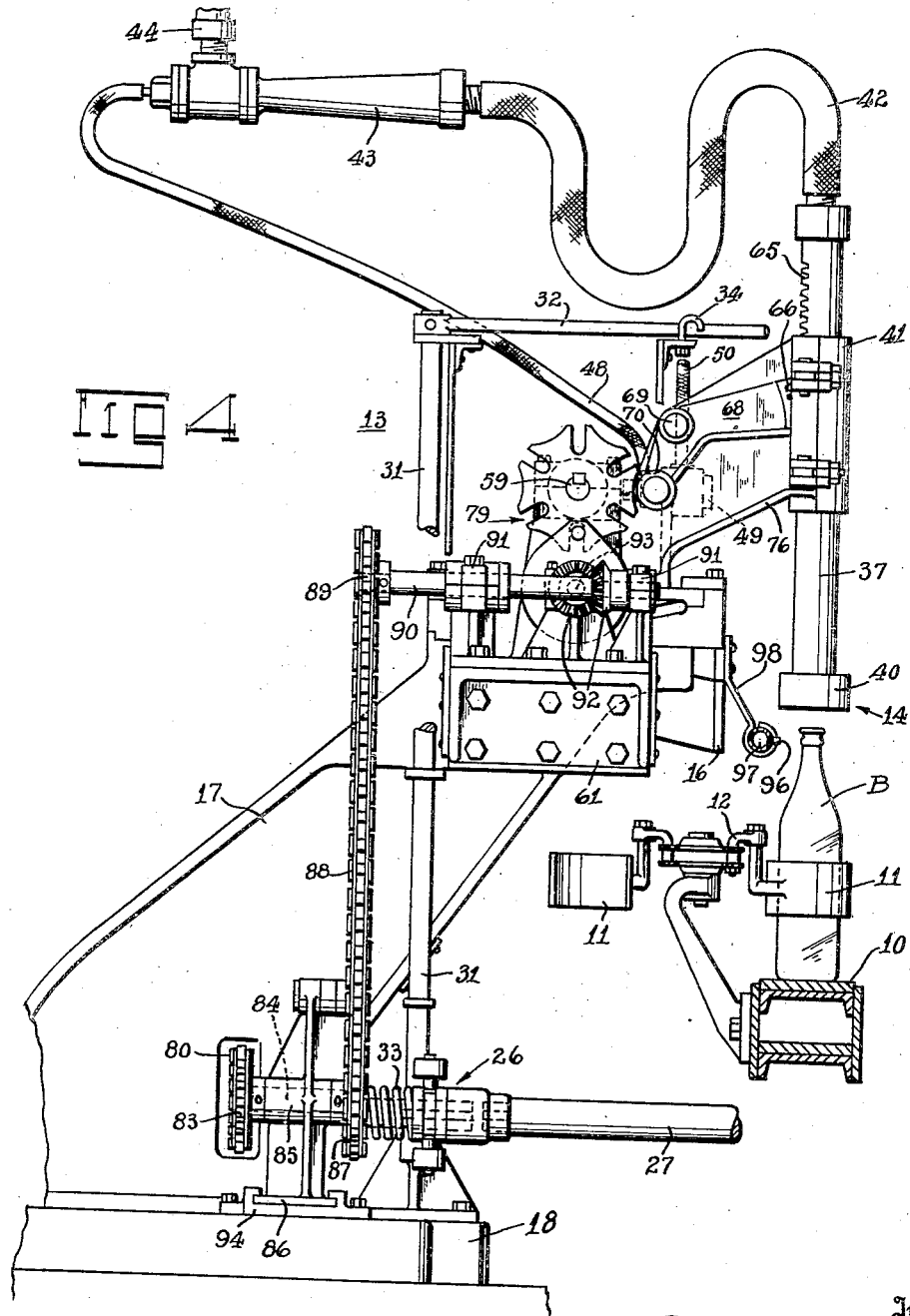

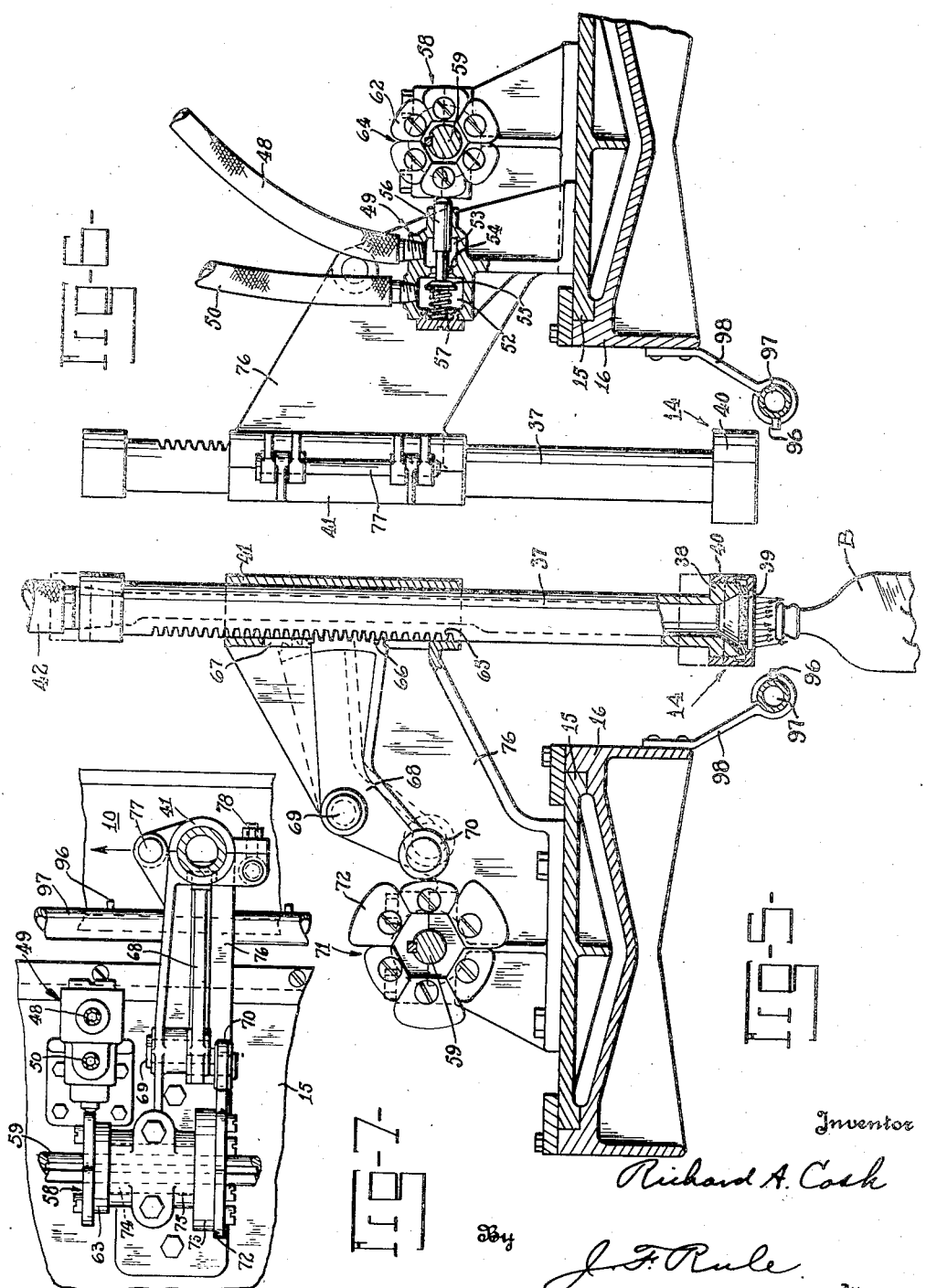

Patented Mar. 6, 1934

1,949,901

UNITED STATES PATENT OFFICE 1,949,901

APPARATUS FOR FIRE FINISHING GLASS ARTICLES

Richard A. Cosh, Marion, Ind., assignor to Owens-Illinois Glass Company, a corporation of Ohio Application June 29, 1932, Serial No. 619,911

13 Claims. (Cl. 49—58)

My invention relates to improvements in apparatus for fire finishing glass articles such for example as machine made bottles and/or other glass containers.

In the manufacture of bottles and the like glass containers, mold charges of molten glass are ordinarily introduced into a blank mold which consists of partible cooperating body blank and neck molds. A plunger tip projecting into the neck mold forms an initial blow opening in the blank or parison and cooperates with the neck mold in forming the neck of the glass container. The blanks are then transferred to a finishing mold in which the bottles are blown to finished form. Ordinarily, in the production of articles of glassware in accordance with the above method, there is formed a rather sharp edge or corner around the upper end of the bottle where the neck mold and plunger tip meet. Also, small ledges or seams are formed at diametrically opposite points on the bottle neck and finish where the neck mold sections meet.

Perfect sealing of containers embodying the above defects is extremely difficult if not impossible to obtain, owing to the fact that the sealing gaskets on the closures or caps are torn or otherwise distorted by the sharp edges, etc. to such an extent that an air tight seal cannot be effected.

An object of the present invention is the provision of automatic means for overcoming the above objections by removing the defects in the finish and neck portions of bottles and jars and producing a smooth surface entirely free from sharp edges and other rough formations. The means for accomplishing this result operates without retarding or interrupting normal travel of the articles from the forming machine to the leer or oven in which the articles are annealed.

Another object is the provision in an apparatus of the above character, of means operating automatically to compensate for variations in the height of articles being fire finished. In this connection it is understood that a single forming machine may, for example, be producing as many as six different types of bottles, all of different heights and each, therefore, requiring a different setting of the fire finishing apparatus in order to insure satisfactory treatment of the bottles. The present invention includes a plurality of burners located above an endless conveyor on which the bottles or other articles are supported and carried from the forming machine to the leer, these burners being mounted for vertical reciprocation in a manner to place them at different elevations as may be required by the height of bottles or other articles produced on the forming machine.

A further object is the provision of a fire finishing apparatus consisting of a plurality of vertically adjustable burners which are mounted for unitary movement back and forth along the path of travel of articles being transferred from a forming machine to a leer, the movement of these burners being such that groups of articles are fire finished without having their movement to the leer interrupted or in any manner retarded.

Other objects will be in part apparent and in part pointed out hereinafter.

In the drawings:

Fig. 1 is a front elevational view of the fire finishing apparatus.

Fig. 2 is a plan view thereof with the fuel gas and air supply pipes removed.

Fig. 3 is a sectional elevational view taken along the line III—III of Fig. 2.

Fig. 4 is a detail sectional elevational view taken along the line IV—IV of Fig. 2.

Fig. 5 is a fragmentary sectional elevational view showing in detail the mechanism for automatically raising and lowering the burners.

Fig. 6 is a fragmentary sectional elevational view showing in detail the cams for regulating the air control valve for one of the burners.

Fig. 7 is a fragmentary plan view with parts in section, showing the burner lifting and air control devices.

In more or less general terms the invention consists in the arrangement of a fire finishing apparatus in position to heat treat glass articles such as bottles and jars while they are moving normally from a forming machine to an annealing leer. The articles are ordinarily transferred to the leer by means of a continuously moving horizontal conveyor upon which they stand upright. The fire finishing apparatus includes one or more burners disposed above the conveyor and mounted for up and down movement to compensate for variations in the height of the articles being fire finished. Such up and down movement is effected automatically and in a predetermined variable order so that articles of various heights produced on a single machine may be fire finished without requiring the constant attention of the operator to the setting of the burner or burners. The burners are also reciprocated along the path of travel of the articles. In one direction the burners are vertically aligned with the articles and travel at the same speed as the article conveyor, while in the reverse direction the burners move at a much higher speed than that of the conveyor in order that they will reach the starting point in time to register with other articles entering and/or passing through the fire finishing zone. Thus the articles will be subjected to the necessary fire finishing operation or operations without having their normal travel to the annealing leer interrupted in any manner.

Bottles or the like glass articles B are transferred from a forming machine (not shown) to an annealing leer (not shown) by means of a continuously moving horizontal conveyor 10 upon which they are successively carried through a fire finishing zone F. The bottles are maintained in uniform spaced relation on the conveyor 10 by means of a series of arms 11 carried by an endless chain 12. The chain and conveyor move at the same speed and receive their power from any suitable source (not shown). As the bottles or other articles travel through the fire finishing zone "F" their upper ends including the sealing surface and neck portions, are fire finished by means of a fire finishing apparatus 13.

Specifically, the illustrated embodiment of the fire finishing apparatus includes a series of four burners 14 suitably supported upon a horizontal slide 15 which in turn is mounted in a slideway 16 arranged parallel with the conveyor 10. This slideway 16 is supported upon a pair of brackets 17 rising from the ends of a stationary base 18. The slide 15 is adapted for reciprocation in a direction parallel with the length of the conveyor 10 so that the burners which are carried by the slide and disposed directly over the conveyor may be caused to travel in register with the bottles or other articles during the fire finishing operation. The mechanism for reciprocating the slide 15 includes a continuously rotating cam 19 on the upper end of a vertical shaft 20 which is journaled in bearings provided at the upper and lower ends of a pedestal 21. An arm 22 on the slide 15 carries a cam roll 23 which engages said cam. A horizontal shaft 24 at the lower end of the pedestal 21 has driving connection with the lower end of the vertical shaft 20 through a pair of meshing bevel gears 25. A clutch 26 provides connection between the horizontal shaft and a main drive shaft 27 which may and preferably does obtain its power from the driving mechanism for the forming machine. The clutch 26 may well be of conventional form and manually controlled by means of a throw-out lever 28 connected through a bar 29, link 30, and vertical shaft 31, to a control handle 32. A coil spring 33 forming a part of the clutch mechanism, normally and yieldingly holds the clutch in position to maintain driving connection between the main shaft 27 and said horizontal shaft 24. By moving the lever 32 to the left as in Fig. 1 and securing it in position by means of a holder 34, driving connection between said shafts will be broken.

By reference to Fig. 2 it will be noted that the cam 19, which rotates in a counter clockwise direction, includes a continuously curved portion 35 which operates to slowly advance the burners 14 at the same speed as the conveyor 10 so that said burners are aligned with groups of bottles B or other articles during the time the latter are traveling through the fire finishing zone F. The straight short section 36 of the cam operates to quickly move the slide 15 and therewith the burners 14 in the reverse direction and at a considerably higher speed than the forward or advancing speed. This is necessary in order to return the burners to the starting point in time to register with the next succeeding group of bottles or other articles.

The burners in addition to being reciprocated as set forth above, are moved vertically at regular time intervals independently of each other thereby changing the spaced relation between the burners and conveyor to accommodate bottles and jars of different heights. The construction of the burners and operating mechanism therefor may be substantially as follows. Each burner consists of a vertical tube 37 having an enlarged externally screw threaded head 38 at its lower end. A perforate disk 39 is held against the lower end of the head 38 by means of a flanged collar 40 which is threaded upon said head. The tube 37 extends vertically through a bearing 41 or guide, and at its upper end is connected to a fuel supply pipe 42 which leads to a Venturi tube 43. This Venturi tube is connected through a valve 44, pressure regulator 45, and a pipe 46 to a fuel gas supply pipe 47 or header. An air supply pipe 48 provides connection between the Venturi tube 43 and a cam controlled valve 49 (Fig. 6) which in turn is connected through a pipe 50 to an air supply pipe 51.

The valve 49 includes a chamber 52 connected to the constant air supply pipe 50 and a chamber 53 communicating with the pipe 48 leading to the Venturi tube 43. A port 54 in the wall separating the two chambers 52 and 53, is normally closed by a valve disk 55 which is fixed to the inner end of a valve stem 56. A coil spring 57 yieldingly holds the valve disk closed. Periodic opening of the valve disk 55 is obtained by means of an intermittently rotating cam 58 which engages the valve stem 56. This cam is mounted upon a horizontal shaft 59 journaled in a pair of bearings 60 one of which is mounted on the slide 15 while the other is supported upon a table extension 61 on one of the brackets 17. The cam 58 (Figs. 6 and 7) consists of an annular series of removable lobes 62 which are separably attached to a collar 63 carried by the shaft 59. These lobes are of such form that when assembled they provide a series of uniformly spaced depressions 64 or recesses into which the valve stem 56 may project during the intervals between actual operation of the burner.

The burner, as brought out heretofore, is capable of vertical adjustment and is so adjusted automatically at regular time intervals in order to accommodate bottles or other articles of different heights. The construction by which this is accomplished consists of a rack bar 65 formed along one side of the vertical tube 37 or holder and a sector gear 66 meshing with said rack bar. This sector gear operates through a vertical slot 67 in the bearing 41. A bell crank lever 68 pivoted to a horizontal hinge pin 69 carries the sector gear 66 at one end and a cam roll 70 at its other end. This cam roll is adapted for engagement with an intermittently rotating cam 71 which is mounted upon the horizontal shaft 59, said cam including an annular series of lobes 72 removably attached to a collar 73. These lobes vary in size in accordance with the variations in the successive operating positions to be assumed by the burner. It will be noted by reference to Fig. 7 that the collars 63 and 73 which carry the cams for operating the valve 49 and bell crank lever 68, are formed at opposite ends of a sleeve 74, said sleeve journaled in a bearing 75 provided at the inner end of the bracket 76 on which the burner bearing 41 is mounted.

The bearing 41 or guide in which the burner slides up and down, is of such form that it permits ready removal and replacement of the burner. The construction consists of two half sections pivoted to a vertical hinge pin 77 and lock bolts 78 which secure the two sections together.

Intermittent rotation of the cam shaft 59 is obtained by means of a Geneva gear mechanism 79 arranged at one end of said shaft and supported on the table extension 61. Operation of the Geneva gear mechanism which is of conventional form, is obtained by means including a sprocket chain 80 trained over as sprocket 81 on the shaft 24 (Fig. 2) said chain also trained over a sprocket 83 at one end of a shaft 84. This shaft 84 is journaled in a bearing 85 on a sliding carrier 86. A sprocket 87 is carried at the end of the shaft 84 opposite the sprocket 83 and has a vertically disposed sprocket chain 88 trained thereover, said chain also trained over a sprocket 89. The sprocket 89 is mounted on one end of a horizontal shaft 90 journaled in bearings 91 on the table extension 61. By means of bevel gears 92 and a shaft 93, driving connection between said shaft 90 and the Geneva gear movement is effected. The slide 86 is adapted for movement in the direction of the length of the base 18 in a slideway 94 for the purpose of taking up slack in the sprocket chains 80 and 88. Adjustment of the position of the slide 86 is obtained by means of an adjusting screw 95 (Figs. 1 and 2). Due to the position of the adjusting screw 95, it also serves as a stop limiting movement of the slide 86 toward the center of the apparatus.

In order to insure periodic lighting of the burners, pilots 96 individual thereto are provided, said pilots being disposed at an elevation substantially midway between the two extreme postions of adjustment of the burners and obtaining fuel gas from a pipe 97 or manifold. This pipe extends lengthwise of the apparatus and is connected to the lower portions of the slideway by brackets 98. Fuel gas may be supplied to the pipe 97 by any suitable means (not shown).

The operation is substantially as follows. Assuming that four bottles or similar glass articles have been brought to the fire finishing zone F by means of the conveyor 10 and that the bottles are spaced apart uniformly as are the burners 14, said burners and the bottles B (Figs. 1 and 2) will upon vertical alignment thereof, be caused to travel together in the direction of the movement of the conveyor 10 a distance of approximately three-quarters of the distance between two adjacent burners. Such movement is obtained by rotation of the cam 19 and during the time that the curved portion 35 engages the cam roll 23 on the arm 22. During this movement of the burners the valves 49 are open to supply air to the burner. Thus an intense flame is applied to the neck and possibly the shoulder portions of bottles in the fire finishing zones. It is understood that gas flows constantly to the burners and the pilots insure burning of the gas. While the fire finishing operation is being carried out one of the lobes on the cam 71 (Fig. 5) operating through the bell crank lever 68 and sector gear 66, supports the corresponding burner at a predetermined elevation above the bottle being heat treated.

Upon completion of the fire finishing of one bottle or possibly a group of four, as shown in Fig. 1, and while the bottle is moving the remaining quarter of the distance between two burners, the burner or burners will be returned to the starting point. This reverse movement of the burner or burners is accomplished in the same length of time as that during which the bottles move the remaining quarter of the distance between the burners with the result that accurate registry of the burner and another bottle just entering the fire finishing zone F will be obtained. If, for example, the next bottle entering the fire finishing zone is shorter than the preceding one, the burner will be automatically lowered to compensate for the difference in height of the bottle. This is accomplished by the relative setting of the lobes 72 on the cam 71 (Fig. 5). As brought out heretofore, the cams which control the operating position of the burners and supply of air thereto, rotate intermittently with the shaft 59.

With an apparatus such as that disclosed herein it is evident that limitation as to the variety of sizes (different heights) of bottles or other articles which may be fire finished is determined only by the size of the cam 71 and the number of lobes of a given size it may carry. In a set up such as that illustrated herein, only two different heights of bottles are being fire finished in view of which alternate lobes on the cam 71 are identical in shape and size. Also, it is evident that a bottle may be caused to pass through the fire finishing zone without being fire finished. This may be necessary where a machine is producing four or five different heights of bottles and for some reason fire finishing of one of the bottles is not desired. For this purpose one or more of the lobes on the air control cam 58 will be removed.

Modifications may be resorted to within the spirit and scope of the appended claims.

What I claim is:

1. The combination of a continuously traveling conveyor upon which a series of articles are brought in succession to a fire finishing zone, a series of longitudinally spaced burners in said zone, means for imparting unitary movement to the burners in the direction of travel of the conveyor and in register with articles supported on the latter and then returning the burners to the starting point, and automatic means for imparting vertical movement to the burners at regular time intervals in a predetermined order and holding the burners at different elevations during successive movements thereof in register with the articles.

2. In combination, a continuously moving horizontal conveyor upon which glass articles are supported and moved in succession through a fire finishing zone, a series of burners arranged in the said zone over the conveyor and uniformly spaced apart lengthwise of the conveyor, means for reciprocating the burners lengthwise of the conveyor in timed relation to movement of articles through said zone, and automatic means individual to the burners for moving them vertically to different operating elevations prior to movement with the articles and holding them at such elevations during such movement with the articles.

3. In combination, a continuously moving horizontal conveyor upon which articles are supported and carried through a fire finishing zone, a fire finishing apparatus including a series of burners arranged in said zone over the conveyor, a horizontal slide carrying said burners and mounted for reciprocation in a direction parallel to the length of the conveyor, an arm extending laterally from one margin of the slide, a cam roll on said arm, and a continuously rotating cam engaging said roll and shaped to move the slide and burners a predetermined distance in the direction of travel of the conveyor and at the same speed as that of the conveyor and then reversing the direction of travel of the slide causing it to return to the starting point at a higher rate of speed than that of the conveyor.

4. In combination, a continuously moving horizontal conveyor upon which articles are supported and carried through a fire finishing zone, a fire finishing apparatus including a series of burners arranged in said zone over the conveyor, a supporting frame arranged alongside the conveyor, a horizontal slideway provided in the upper portion of the frame and extending parallel to the length of the conveyor, a slide mounted in the slideway, brackets on the slide for supporting the burners, and means for reciprocating the slide in a fashion to maintain alignment of the burners and articles during a predetermined extent of travel of the articles through said fire finishing zone.

5. In combination, a continuously moving horizontal conveyor upon which articles are supported and carried through a fire finishing zone, a fire finishing apparatus including a series of burners arranged in said zone over the conveyor, a supporting frame arranged alongside the conveyor, a horizontal slideway provided in the upper portion of the frame and extending parallel to the length of the conveyor, a slide mounted in the slideway, brackets on the slide for supporting the burners, and means including a continuously rotating cam for reciprocating the slide and burners in a fashion to effect vertical alignment of the burner and articles during a predetermined portion of their travel through the fire finishing zone, said reciprocating means causing the burner to move in one direction at the same speed as the conveyor and in the other direction at a higher speed than that of the conveyor.

6. In combination, a continuously moving horizontal conveyor upon which articles are supported and carried through a fire finishing zone, a fire finishing apparatus including a series of burners arranged in said zone over the conveyor, a supporting frame arranged alongside the conveyor, a horizontal slideway provided in the upper portion of the frame and extending parallel to the length of the conveyor, a slide mounted in the slideway, brackets on the slide for supporting the burners, means including a continuously rotating cam for reciprocating the slide and burners in a fashion to effect vertical alignment of the burner and articles during a predetermined portion of their travel through the fire finishing zone, and means supporting the burners in the bracket for vertical movement with respect to the conveyor including cams individual to the burners for moving them vertically and thereby changing the operating position of the burners in timed relation to the movement of articles through said zone.

7. In combination, a continuously moving horizontal conveyor upon which glass articles are supported and carried through a fire finishing zone, a fire finishing apparatus including a downwardly facing burner arranged over the conveyor in said zone, a horizontal slide arranged at one side of the conveyor for movement along a path parallel to the length of the conveyor, a bracket fixed to the slide and extending to one side thereof, a vertical bearing at the outer end of the bracket in which the burner is slidingly supported, and means including an intermittently rotating cam for periodically moving the burner and changing the spaced relation between said burner and the conveyor.

8. In combination, a continuously moving horizontal conveyor upon which glass articles are supported and carried through a fire finishing zone, a fire finishing apparatus including a downwardly facing burner arranged over the conveyor in said zone, a horizontal slide arranged at one side of the conveyor for movement along a path parallel to the length of the conveyor, a bracket fixed to the slide and extending to one side thereof, a vertical bearing at the outer end of the bracket in which the burner is slidingly supported, means including an intermittently rotating cam for periodically moving the burner and changing the spaced relation between said burner and the conveyor, and means for reciprocating the slide at regular time intervals whereby the burner travels in register with the articles during a predetermined extent of their movement through said zone.

9. In combination, a continuously moving horizontal conveyor upon which articles are supported and carried through a fire finishing zone, a fire finishing apparatus including a series of burners arranged in said zone over the conveyor, automatic means operating at regular time intervals for moving the burners up and down relative to the conveyor, said means including rack bars and sector gears individual to the burners, rotary cams individual to the burners for operating the sector gears and thereby raising and lowering the burners, means for supplying fuel to the burners including valves individual thereto, a rotary cam for operating each valve, a cam shaft upon which all of the cams are supported, and means for intermittently rotating said shaft and cams.

10. In combination, a continuously moving horizontal conveyor upon which articles are supported and carried through a fire finishing zone, a fire finishing apparatus including a series of burners arranged in said zone over the conveyor, automatic means operating at regular time intervals for moving the burners up and down relative to the conveyor, said means including rack bars and sector gears individual to the burners, rotary cams individual to the burners for operating the sector gears and thereby raising and lowering the burners, means for supplying fuel to the burners including valves individual thereto, a rotary cam for operating each valve, a cam shaft upon which all of the cams are supported, means for intermittently rotating said shaft and cams, a horizontal slide carrying the shaft and burners and arranged for movement along a path parallel with and adjacent the conveyor, and means for reciprocating the slide in timed relation to vertical movement of the burners.

11. In combination, a continuously moving conveyor upon which articles are carried through a fire finishing zone, a fire finishing apparatus including a burner arranged over the conveyor in said zone, a horizontal slide mounted for movement along a path parallel with and adjacent the conveyor, a bracket mounted on the slide and extending laterally therefrom to a point over the conveyor, a vertical bearing at the outer end of the bracket in which the burner is mounted for up and down movements, means including an intermittently rotating cam for raising and lowering the burner at regular time intervals, regulable means for supplying fuel to the burner, automatic means for reciprocating the slide and thereby causing the burner to travel a predetermined distance in said zone in register with articles moving therethrough, the fuel supply means including a valve and an intermittently rotating cam operating the valve in timed relation with up and down movements of the burner, and a single intermittently rotating shaft upon which said cams are mounted.

12. In combination, a continuously moving horizontal conveyor upon which articles are carried through a fire finishing zone, a fire finishing apparatus including a burner arranged over the conveyor in said zone, a vertical guide in which the burner is slidingly supported for movement toward and away from the conveyor, means for imparting vertical movement to the burner including a rack carried by said burner, a bell crank lever pivoted for rocking movement about a horizontal axis, a sector gear at one end of the lever meshing with said rack, an intermittently rotating cam engaging the other end of the lever and adapted to rock it at regular time intervals and hold the burner at different elevations for predetermined periods of time, means for rotating the cam, and means operating in timed relation to vertical movement of the burners for reciprocating all of said mechanism in a direction parallel to the length of the conveyor and thereby causing travel of the burner in register with the articles a predetermined distance.

13. In combination, a continuously moving horizontal conveyor upon which articles are carried through a fire finishing zone, a fire finishing apparatus including a plurality of burners arranged over the conveyor in said zone, vertical guides in which the burners are slidingly supported for movement toward and away from the conveyor, a single horizontal shaft arranged alongside of the burners in spaced relation thereto, means supporting the shaft and burners mounted for horizontal reciprocation in the direction of the length of the conveyor, cams carried by the shaft individual to the burners, means whereby intermittent rotation of the shaft and cams places the burners at different elevations at regular time intervals in timed relation to reciprocation thereof, cam controlled valves for regulating the flow of fuel to the burners, cams individual to the valves carried by said shaft, and means for intermittently rotating the shaft.

RICHARD A. COSH.